Dec. 14, 1971                  R. A. YUZA                3,626,709
APPARATUS FOR PREPARATION OF FROZEN CONFECTIONS
Filed Nov. 24, 1969                              5 Sheets-Sheet 1
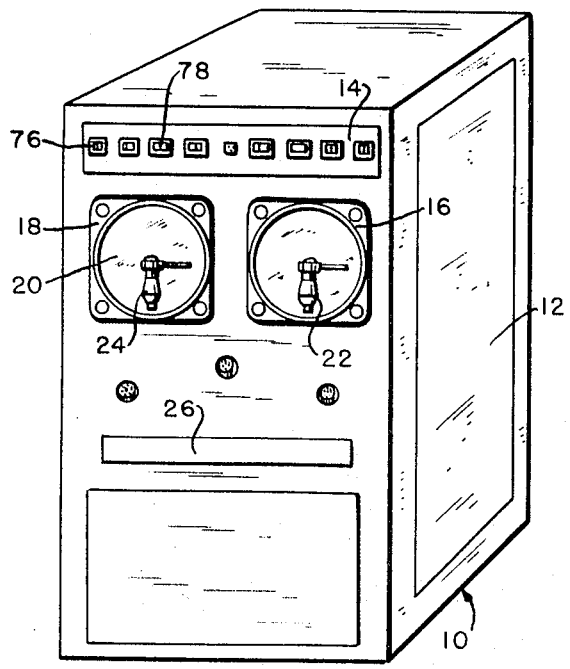
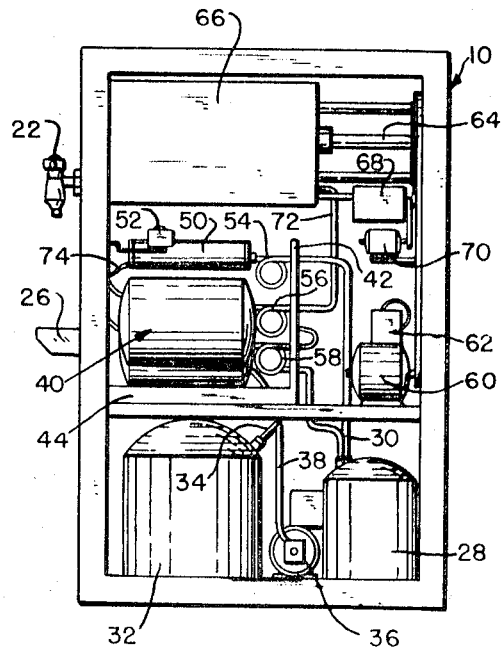
INVENTOR.
RUDOLPH A. YUZA
BY Harbaugh & Thomas
ATT'YS Dec. 14, 1971   R. A. YUZA   3,626,709
APPARATUS FOR PREPARATION OF FROZEN CONFECTIONS
Filed Nov. 24, 1969   5 Sheets-Sheet 2

INVENTOR.
RUDOLPH A. YUZA
BY Harbaugh & Thomas
ATT'YS

Dec. 14, 1971  R. A. YUZA  3,626,709
APPARATUS FOR PREPARATION OF FROZEN CONFECTIONS
Filed Nov. 24, 1969  5 Sheets-Sheet 3
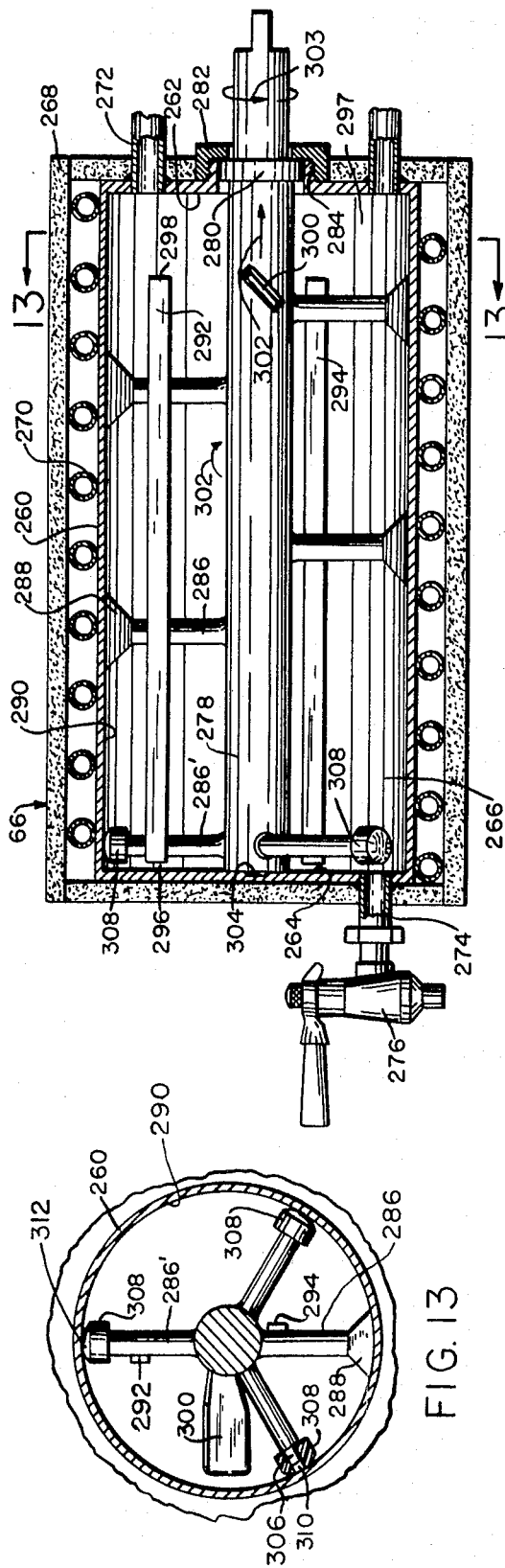
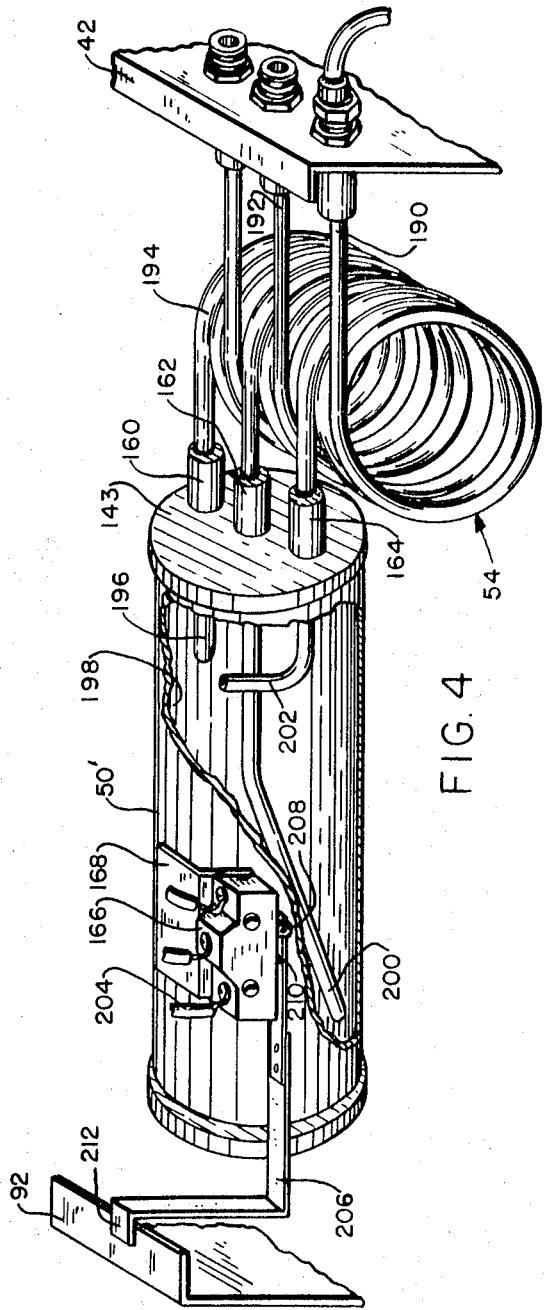
INVENTOR
RUDOLPH A. YUZA
BY
Harbaugh & Thomas
ATT'YS Dec. 14, 1971 R. A. YUZA 3,626,709
APPARATUS FOR PREPARATION OF FROZEN CONFECTIONS
Filed Nov. 24, 1969 5 Sheets-Sheet 4

RUDOLPH A. YUZA
BY Harbaugh & Thomas
ATT'YS

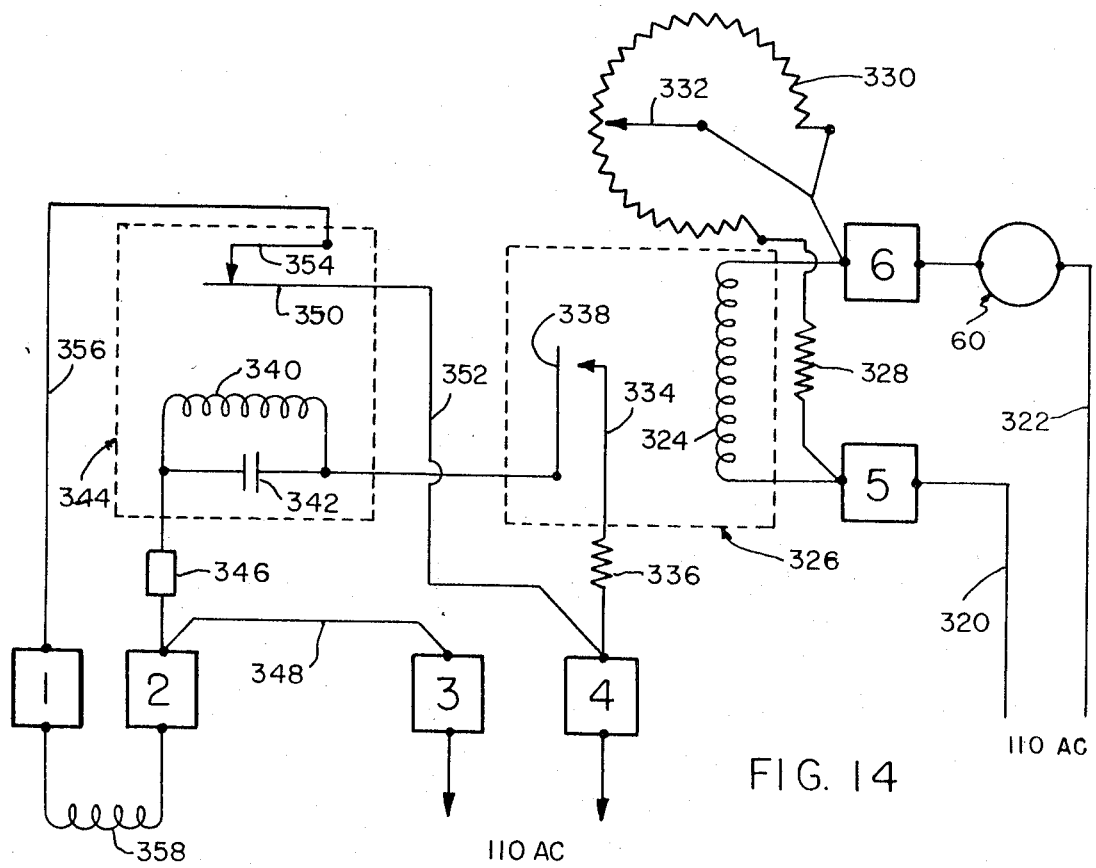
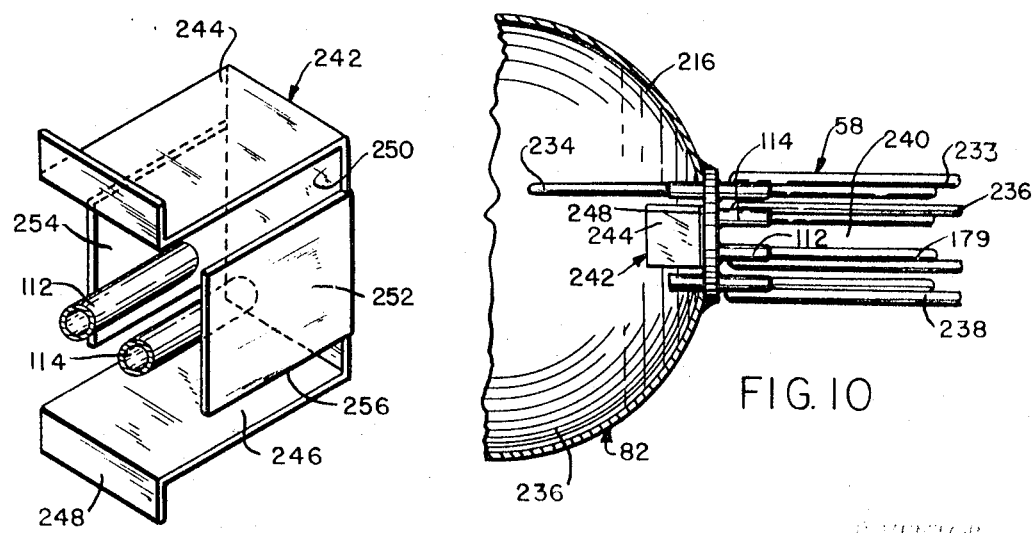

United States Patent Office 3,626,709
Patented Dec. 14, 1971

3,626,709
APPARATUS FOR PREPARATION OF
FROZEN CONFECTIONS
Rudolph A. Yuza, Paris, Ill., assignor to
Astro Controls, Inc., Chicago, Ill.
Filed Nov. 24, 1969, Ser. No. 879,170
Int. Cl. F25c 7/18
U.S. Cl. 62—136                                    15 Claims

ABSTRACT OF THE DISCLOSURE

A blending and freezing apparatus including weight sensitive pivotally-mounted syrup supply, carbonator and blender receptacles, automatic liquid level and delivery control means therefor, means to disperse and mix carbonated water and syrup under pressure of a carbonating gas to produce a carbonated liquid feed, a freezing zone including means to apply a shearing force upon and through the solidifying liquid feed to maintain same as a flowable mass, means to regulate the refrigeration conditions applied to the freezing zone in accordance with the torque required to drive the shearing force, means to maintain a reverse flow pre-cooling zone in the freezing zone and prevent channeling therethrough and means to discharge the product to atmosphere.

BACKGROUND OF THE INVENTION

Iced, carbonated soft drinks composed of a flavoring substance, usually in the form of a syrup or fruit concentrate, water and a carbonating gas, such as carbon dioxide are well know. The presence of ice in the drink, for the purpose of attaining a desired lower temperature has the disadvantage of diluting the product as the ice melts and also accelerates the escape of carbonation with attendant depreciation of the taste of the product. Methods and apparatus have been devised to automatically produce carbonated beverages or soft drinks having optimum concentration of flavoring, adequate carbination and a low temperature. A slushy heterogeneous mixture of liquid phase and frozen or solid phase particles is obtained in these processes and through the use of the apparatus, which may or may not retain a uniform concentration of ingredients in both phases during melting of the frozen particles. Most beverage products so processed comprise a non-uniform slushy ice mixture of a water solution of flavoring substance. The drink may be agitated under ideal temperature conditions in the freezing chamber for super-cooling and under super-atmospheric pressure conditions created by the carbon dioxide to produce a drink which, when dispensed to the atmosphere, partially freezes or crystallizes spontaneously with the frozen particles or crystals having substantially the same concentration of flavor as the liquid phase of the drink in the freezing zone.

A process of this nature is described in U.S. Pat. No. 3,044,878 wherein the carbon dioxide, water and syrup are introduced into a freezing chamber with the temperature of the beverage being lowered to at least its freezing point while maintaining the beverage in the liquid state in the chamber by means of super atmospheric pressure and agitation. A baffle plate is provided between the inlet of the freezer and the outlet or discharge and scrapers are provided to prevent the accumulation of any solid phase in the mix before it is discharged. Under these conditions part of the beverage upon being dispensed freezes immediately to form a soft drink comprising both liquid and solid phases. The spontaneous freezing is due to the low temperature of the product, the release of pressure and the escape of a large amount of carbon dioxide from within the product. It is also old in this art to provide control means comprising conductivity probes for automatically regulating the amount of flavored liquid within the freezing chamber and for replenishing the supply of liquid therein after a dispensing operation.

In these processes and apparatus, which operate at about 12 to 18 p.s.i.g., the chilling of the material in the freezing chamber is controlled so that the temperature of the carbonated beverage is lowered to at least its freezing point, which may be about 32° F. and the temperature of the mixture in the freezing chamber will be reduced to 32° F. or to a lower temperature, no lower than 28.5° F. or anywhere between about 28.5 to 32° F. The prior art devices include rotatable impellers so that agitation in the freezer is both vigorous and continuous, which in conjunction with the pressure of carbonating gas in the freezing chamber, prevents freezing of the carbonated beverage and prevents the formation of any frozen particles or crystals thereof during the cooling step. Because of the structure of impellers used which are designed to stir liquids, particular precautions are taken to prevent the formation of ice on the inside surface of the freezing chamber and consequent channeling of liquid phase through the chamber without adequate cooling. Under these conditions the pressure of carbonation aids in dispensing the liquid product which upon entry into the atmosphere, because of its super-cooled condition, immediatedy crystallizes or freezes to some extent and the final product is an icy, slushy mixture of liquid and solid phases.

SUMMARY OF THE INVENTION

This invention concerns means to control the supply of ingredients to the freezer, means to control the conditions in the freezing chamber to actually freeze the ingredients therein and means to apply a controlled shear or agitation dependent upon the consistency of the frozen mass whereby the product being dispensed expands to a homogeneous, creamy, finely divided solid, long enduring stand-up mass.

In accordance with this invention, means are provided to control the supply of ingredients, meter the carbonated blend to the freezing chamber, lower the temperature of the ingredients in the freezing chamber to a temperature sufficient to freeze the flavored carbonated water blend into a homogeneous mass and simultaneously apply vigorous shear and stirring action to the mass to maintain it in a fluid or flowable condition to produce a dispensed homogeneous product of enhanced characteristics. In one embodiment the beater blades are arranged to detect the average viscosity across the cross-section of the freezing mass and a reverse impeller at the inlet end of the freezer produces a pre-cooling zone that prevents channeling in the freezing chamber.

DESCRIPTION OF THE DRAWINGS

An illustrative and non-limiting example of this invention is shown in the drawings wherein:

FIG. 1 is an isometric view of apparatus of this invention with dual freezing zones for different flavored products or for dispensing the same product from dual discharge valves;

FIG. 2 is a plan view of the side of the cabinet with the side panel removed to show the general arrangement of the parts;

FIG. 4 is a perspective view of a sentinel used to monitor the syrup or flavoring material to the system;

FIG. 4A is an end view of the sentinel shown in FIG. 4;

FIG. 9 is a fragmentary side view of the inlet of the blender;

FIG. 10 is a fragmentary top view of the inlet of the blender;

FIG. 11 is an isometric view of the baffle plate in the blender;

FIG. 12 is a partial cross-sectional view of the freezer zone;

FIG. 13 is an end view of the beater shaft; and

FIG. 14 is an electrical diagram showing the viscosity torque control system.

THE PREFERRED EMBODIMENT

Figure 3A:
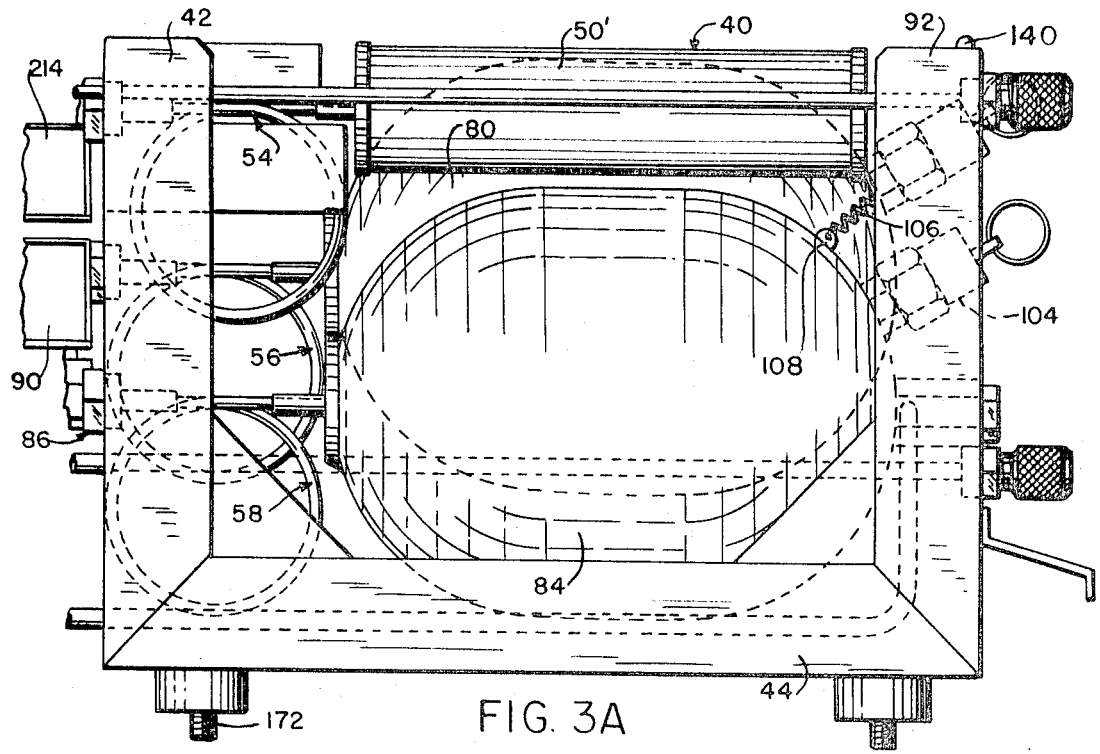
FIG. 3A is a side view of the arrangement shown in FIG. 3.

Referring to FIG. 1 the apparatus of this invention is shown as a self-contained unit having the cabinet 10, with the side panel 12 and having a switch and control panel 14 along the top front. The end plates 16 and 18 of a pair of freezing chambers housed within the cabinet are shown which may have opaque or transparent walls 20 through which extend the dispensing valves 22 and 24 for the same or different flavors of frozen flavored product. The device can include a cup dispenser (not shown) and the drip tray 26 may be provided for cleanliness of operation.

Referring to FIG. 2 the unit is divided into three sections for convenience in locating the parts, maintenance thereof and to provide proper elevation for the dispensing valves 22 and 24. Thus, to illustrate, the bottom section can contain the syrup supply tank 28 with a feed conduit 30, the carbon dioxide tank 32 with its feed conduit 34 and the water pump 36 with the delivery pipe 38 supplying flavoring material, carbonation and water to the carbonator-blender system in the middle section 40, supported in a suitable frame member 42, having a base 44.

The carbonator-blender system 40 includes a pair of syrup sentinels indicated at (only one appearing in this view) 50 each having a micro-switch 52. These containers are resiliently mounted to the frame 42 by means of a plurality of coiled stainless steel inlet and outlet pipes indicated at 54, 56 and 58, to be described. The drive motor 60 has the starter 62 and is connected by suitable drive means and connecting shafts as indicated at 64 to the beater shafts of the freezer unit generally indicated at 66. Refrigeration is supplied by means of the refrigeration unit 68 having a separate motor drive 70. The liquid blend to be frozen to prepare the product is transferred through the line 72 to one or both of the freezer cylinders. The freezer unit 66 is suitably insulated to reduce heat losses, etc. Control wires from the micro-switches and other controls leading the control panel 14 are illustrated at 74.

The blender and carbonator tanks in the system 40 also have individual micro-switches sensitive to their pivotal positions and controlling solenoid valves which maintain a constant liquid level therein. The control panel 14 has such switches 76 and indicator lights 78 as may be required to turn the blender tanks on or off, indicate the liquid level condition in the syrup sentinels 50 and also control the operation of the carbonator.

Figure 3:
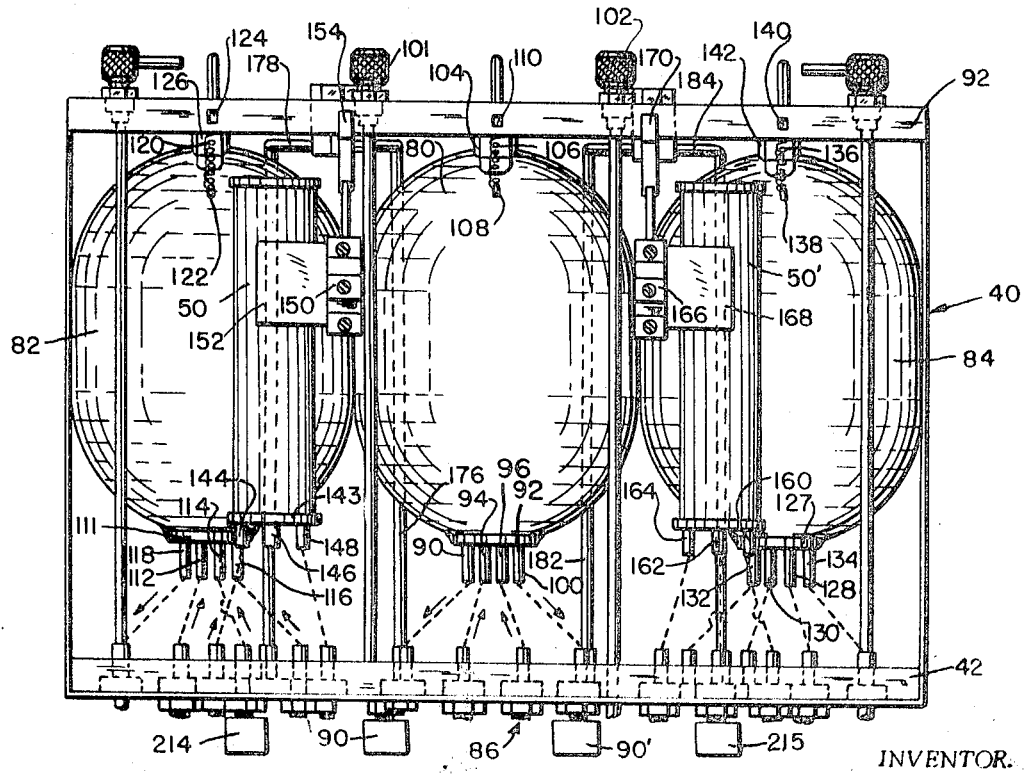
FIG. 3 is a top plan view of the carbonator-blender and sentinel arrangement including a portion of the manifold conduits used therewith.

In FIG. 3, to illustrate, the carbonator-blender unit 40 can have a single carbonator tank 80 to supply carbonated water to a pair of blender tanks 82 and 84 each having a syrup sentinel indicated at 50 and 50' operating in conjunction therewith to form a carbonation-blender system for two freezer chambers. The micro-switches for the tanks 82 and 84 are omitted from FIG. 3 for simplicity, but are shown at 85 in FIG. 5. The frame 42 provides support for the manifold 86 (FIG. 3) and the solenoid valves such as 90 at the inside of the unit while the front panel supports various metering valves, etc., as will be described.

The carbonator tank 80 has the end manifold plate 92 supporting the high pressure carbon dioxide inlet line 94, the pump water inlet line 96, and a pair of carbonated water outlet lines 98 and 100. This common carbonator 80 supplies carbonated water from the lines 98 and 100 to respective blender tanks 82 and 84 and flow thereof is controlled by the respective manually controlled metering valves 101 and 102 on the front or inside of the unit. The blender is equipped with a pressure relief valve indicated at 104.

The connections between the manifold lines 94–100 are shown in broken lines in FIG. 3 since these are resilient coil tube mountings 56, to be described, which pivotally support the carbonator tank 80 within the frame members 42–92. Additional resilient support for the blender is provided by the tension coil spring 106 attaching between the tab 108 and the attaching point 110 on the top of the member 92. This arrangement is better shown in FIG. 3A.

The blender 82 is provided with the end manifold plate 111 to support the carbonated water inlet 112, the syrup inlet 114, the low pressure carbonating gas inlet 116 and the liquid blend outlet 118. The resilient mounting for this manifold comprises coil tube connections 58 to the manifold 86, to be described, and these connections are also illustrated by the broken lines. Also illustrative flow directions to and from the carbonator 80 and the blender 82 are shown by the arrows adjacent these broken lines. The blender tank 82 is suspended at the end opposite this pivotal mounting by means of the tension spring 120 suitably attached at tab 122 to the tank and at tab or point of attachment 124 to the frame member 92. The pressure relief valve for the blender 82 is indicated at 126.

The blender 84 has a similar manifold plate 127 holding the carbonated water inlet line 128, the syrup inlet line 130, the low pressure carbonating gas inlet line 132 and the liquid blend outlet line 134. Here again the resilient mounting comprising a coiled tube assembly 58, to be described, is shown in broken lines showing flow to and from the manifold 86 and the blender 84.

The supporting tension spring for the blender 84 is shown at 136 affixed at the tab 138 to this tank and at tab 140 to the member 92. The relief valve for this blender tank is shown at 142.

Still referring to FIG. 3, the syrup sentinels 50 and 50' are shown in their relationship to the carbonator and blender tanks just described. The sentinel 50 has the manifold 143 comprising the syrup inlet line 144, the syrup outlet line 146 and the bleed line 148. The sentinel 50 is suspended entirely by resilient coiled stainless steel tubes 54 connecting between this manifold and the manifold 86 as indicated by the broken lines. The micro-switch 150 is attached to the sentinel 50 by means of the bracket 152 and has its sensing lever 154 extending to a fixed point on the frame member 92, so that any change in the elevation of the sentinel 50 about its resilient mounting trips the micro-switch as will be described.

The sentinel 50' is similarly provided with a manifold plate supporting the syrup inlet line 160, the syrup outlet line 162 and the bleeder line 164 and the micro-switch 166, attached to the bracket 168 and having its sensing lever 170 in sensing contact with the top of the frame 92 in the same manner as the micro-switch 150. The micro-switches 150 and 166 are double acting micro-switches.

The tanks 80, 82 and 84 can be, and preferably are, identical in shape and size as shown and the sentinels 50 can be, and preferably are, identical and cylindrical in form.

Referring briefly to FIG. 3A it is seen that the carbonator 80 is located slightly above and between the pair of blenders 82 and 84 in such a manner that the respective sentinels 50 and 50' can be located partly over the blenders along each side of the carbonator to form a compact unit. Mounting studs to fasten the carbonator-blender unit 40 to the cabinet 10 are illustrated at 172. The flow of water to the carbonator 80 is from the pump 36 through a check valve (not shown) around one of the resilient coils 174 (see FIG. 7) of the four-coil suspension 56 and into the line 96. The carbonated water from the carbonator 80 passes out of the manifold line 98 through the resilient coil 175, then through the solenoid valve 90 for controlled flow to the blender 82. From the outlet of the valve 90 the carbonated water passes into the line 176 whence it is metered by the valve 101 and passes through the line 178 back to the manifold 86 and thence into the coils 179 of the resilient suspension 58 (see FIG. 10) that connect to the line 112 of the blender 82. Similarly carbonated water from the second outlet 100 of the carbonator 80 passes through the coil 180 (see FIG. 7) of the manifold 56 of the carbonator through the solenoid valve 90' to a check valve and into the line 182 controlled by the metering valve 102, and finally into the line 184 and to the coiled spring tubes 179 of the suspension 58 of the other blender 84. If desired, a single solenoid valve 90 can be used to control the flow of carbonated water to both blenders through branch lines, instead of a separate control to each as just described.

FIGS. 4 and 4A are more detailed views of one of the sentinels 50' showing the end plate 143 through which are affixed, as by brazing or silver soldering, the lines 160, 162 and 164. The coil suspension system 54 for the sentinels comprises the individual three-loop coils 190, 192 and 194 that are substantially in axial alignment and spaced from each other. The syrup inlet tube 194 terminates at 196 in communication with the interior 198 of the receptacle. The syrup withdrawal tube 192 extends into the interior of the receptacle and has the downwardly extending section or dip-tube 200 which is always below the liquid level therein. The tube 190, on the other hand, terminates in the elbow bend 202 which extends above the level of the tube 196 and into the upper part of the receptacle. The connecting lines 190–202 comprise an air bleed line to insure that the receptacle can be filled with syrup and will have no bubble of air entrapped in the upper part of the receptacle during operation.

The lead wires for the micro-switch 166 are indicated at 204 and the operating lever 206 is shown to have the pivot point 208 about which it rotates slightly upon change of weight of the receptacle to actuate the switch rod 210. The tip end 212 of the lever 206 can be adjusted by bending for proper contact with the frame member 92 and thus insure that the switch is actuated at the required attitude of the syrup sentinel.

Referring to FIG. 4A, it is seen that the tubes 190, 192 and 194 are identically wound and have their incoming and outgoing coils on the same side. This provides even resiliency and compactness of design. The coils are spaced from each other, as at 212, so as to not come into rubbing contact and provide further uniformness to the suspension and eliminate any tendency to twist on the axis of the receptacle. The bundle of coils 54 for the receptacles 50 are just the reverse of those shown in FIG. 4A and the bracket 152 thereof is on the opposite side as shown in FIG. 3. This balances the assembly and adds to its compactness. The flow of syrup from the sentinels 50 and 50' to their respective blenders 82 and 84 through the connecting discharge lines 162–192 is controlled by means of the double acting micro-switches 150 and 166 acting upon the pair of solenoid valves 214 and 215. These valves can be the same as the valves 90.

Figure 5:
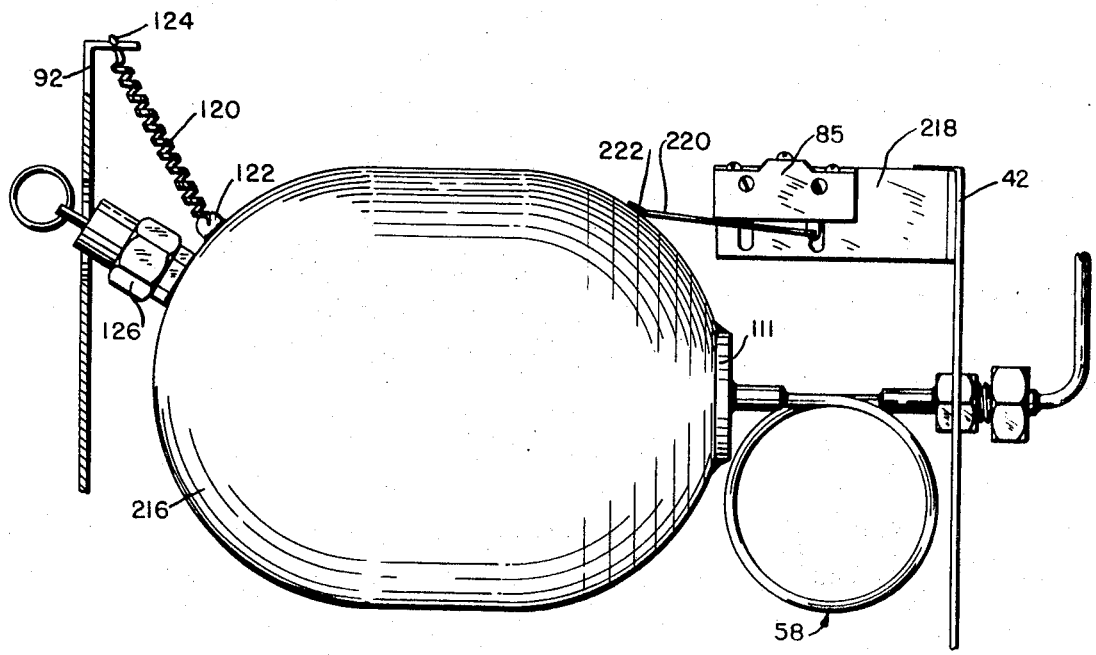
FIG. 5 is a side view of a blender showing the details of the suspension; this figure also illustrates a carbonator.

FIG. 5 can represent a side view of the carbonator 80 or either of the blenders 82 or 84 since the tank 216 for these receptacles can be the same size and shape. The spring 120 is shown in its position between the tab 122 and the point of attachment 124 on the frame 92, which also represents the arrangement of the springs 106 and 136. Since the two blenders 82 and 84 are mounted slightly below the carbonator 80 their springs 120 and 136 are slightly longer. The safety relief valve 126 for the carbonator is the same as the valves 104 and 142. Also the plate 111 is the same as the plates 42 and 127. The coil suspensions 56 and 58 are identical and represented in FIG. 5 by the coil suspension 58 for the blenders 82.

The carbonator 80 and the two blenders 82 and 84 each have a single-acting micro-switch, illustrated at 85 in FIG. 5, supported by a bracket 218 to the support member 42 and provided with a lever 220, the point 222 of which rides upon the curved surface of the respective tank 216 for that unit. As before stated these micro-switches are not shown in FIGS. 3 and 3A. Any change in the attitude of the carbonator 80 or either of the blenders 82 or 84 during operation of the device due to a decrease in the liquid level therein trips the respective micro-switches 85 and closes the solenoid valves 90 and 90' controlling the flow of carbonated water. The micro-switches 85 in the blenders are single-acting switches.

Figure 7:
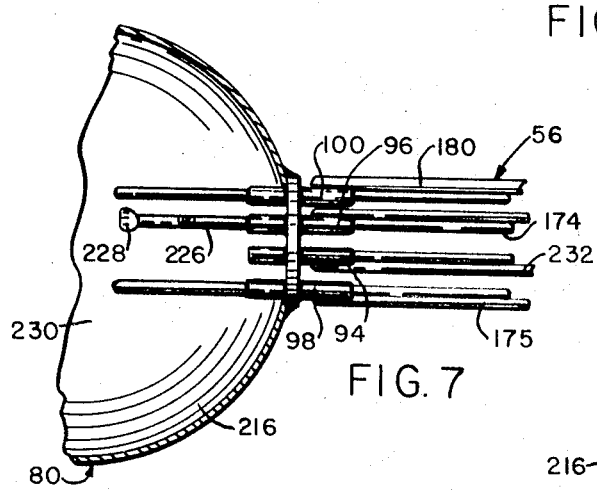
FIG. 7 is a fragmentary partial sectional view of the inlet of the carbonator.
Figure 8:
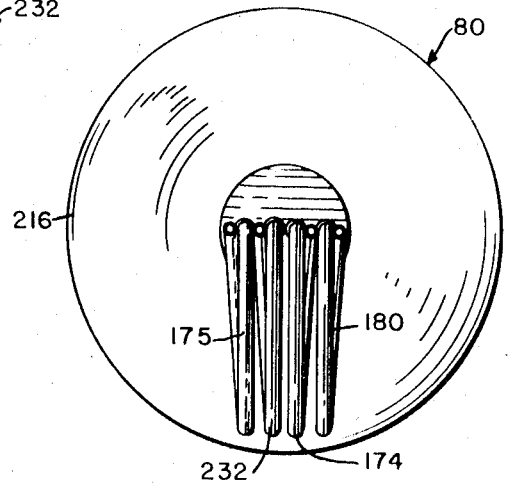
FIG. 8 is an end view of the inlet of the blender.
Figure 6:
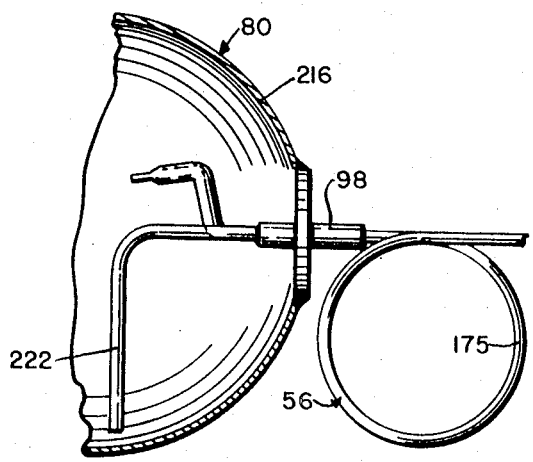
FIG. 6 is a fragmentary cross-sectional view of the carbonator.

Referring to FIGS. 6, 7 and 8 the tube coil suspension 56 for the carbonator 80 has already been partially described. The arrangement has two carbonated water outlet lines 98 and 100 which connect through the resilient coils 175 and 180, located on the outside of the coil assembly 56, and includes the dip tubes 222 at their inner ends which extend below the normal liquid level within tank 216. The coil 174 and line 96 convey water into the carbonator and the latter has the L-shaped extension pipe 226 with a flattened spray head 228 to cause the water to spray into the interior 230 of the tank. The inlet 94 for the carbonating gas is provided with its individual coil 232 in the assembly to maintain a carbonating pressure therein. High pressure water from the pump 36 is supplied to the coil 174.

It is to be observed in FIG. 8 that the pair of coils 175 and 232 on one side are looped to the outside or away from the longitudinal axis of the tank 216 while the pair of coils 174 and 180 on the other side are looped opposite thereto. This structure provides balanced arcuate pivoting of the tank without lateral motion.

The inner structure of the blenders 82 and 84, which are identical, is shown in FIGS. 9 and 10. The carbonated water inlet coil 179 and manifold pipe 112 have already been described. The coil system 58 for the blenders is provided with, as illustrated for blender 82 (formed by the tank 216), the coil 233 for low pressure carbonating gas having the dip tube 234 extending below the liquid level in the interior 235 of the illustrative tank 216. The purpose of the low pressure carbon dioxide is to maintain the blender under carbonating pressure. The coil system also has the coil 236 for syrup from the respective sentinel 50 for that blender and the coil 238 for withdrawal of liquid blend.

Referring to FIG. 10 this same general arrangement of the coil 233, 236, 179 and 238 is preserved as in the coils 56 for the carbonator, whereby a space at 240 is provided on the arcuate pivot path of the blender tanks.

In accordance with one aspect of this invention, baffle means are provided against which the streams of carbonated water and syrup impinge simultaneously and adjacent each other to form the liquid blend or solution to be sent to the freezing zone 66 through the coil 238. One design of baffle plate that is particularly effective in producing instantaneous blending is shown in FIGS. 9, 10 and 11, wherein the housing 242 is provided with the side walls 244 and 246, each having an outwardly directed flange 248 which forms a base with which the housing is affixed as by silver solder to the inside of the vessel 216. The housing has the end wall 250 spaced from and opposite to the inlet lines 112 and 114 as shown in FIG. 11. The remaining sides of the housing are open except for the pair of tabs 252 and 254 which extend from the edge of the wall 250. This forms the exit four slots 256 at each corner of the housing. The carbonated water and syrup under pressure of carbonation are jetted against the wall 250 and thus blended, the product spraying off through the slots 256 and against the inside of the walls of the housing at a multitude of angles.

Referring to FIG. 12, one form of freezing cylinder 66 is shown comprising the cylindrical vessel 260 having the end walls 262 and 264 defining the freezing zone 266. The cylinder is provided with the insulation 268 housing the refrigeration coils 270 through which a refrigeration medium is circulated by means of the pump 68. The wall 262 has one or more inlet conduits 272 and the conduit 274 is provided in the wall 264 for discharge of homogeneous frozen product. The discharge conduit 274 is controlled by the manual valve 276 for dispensing the product intermittently or continuously. The beater shaft 278 extends from the wall 264 out through the bearing seal 280 held by means of the ring 282 which threadably engages the boss 284 in the wall 262.

A series of aligned axially spaced radial spokes 286 are carried by the beater shaft 278 and the innermost of these spokes are provided with scrapers 288, composed of plastic or other non-abrasive tough material which engage the inner wall surface 290.

The spokes 286 are circumferentially spaced (see FIG. 13) from each other, and aligned in pairs with the spokes 286 at the discharge end of the shaft. This arrangement provides aligned support for the pair of shear bars 292 and 294. The bars 292 and 294 are closely spaced from the wall 264, as indicated at 296, but are more widely spaced from the wall 262 as indicated by the space 297 between the bar ends 298 and this end wall. This provides a recycle and pre-cooling zone between the ends 298 of the shear bars and the wall 262. The impeller 300 is affixed at this end of the beater shaft with its blade pitched to impel the incoming liquid blend from lines 272 in the direction of the arrow 302 back against the wall 262, considering that the shaft 278 is rotated in the direction of the arrow 303, as indicated.

The freezer beater shaft abuts against the wall 264 in a thrust bearing arrangement as indicated at 304 and the ends of the circumferentially spaced and radially aligned end spokes 286' are reduced as indicated at 306 to receive the button bearings 308 thereon. The button bearings are provided with a central bore 310 (FIG. 3) to snap-fit upon the reduced end portion 306 and have their outer surfaces 312, which are curved or bevelled to provide a bearing surface against the surface 290 of the cylinder 260. The spokes 286' are of equal length so that the shaft is centered as it rotates and rides upon the button bearings 308. The shaft 278 is driven by the drive motor 60, through the extension drive 64. The speed of rotation is about 1500 to 2000 r.p.m. depending on the type of product being prepared. The button bearings 308 are composed of a plastic having flexibility and wearing properties at low temperatures illustrated by the fluoroplastics including polytetrafluoroethylene (TEE); fluorinated ethylene-propylene (FEP); the chlorotrifluoroethylines (CTEE); and polyvinylidine fluoride (PVF$_2$). These plastics are characterized by their chemical inertness, lubricity, low friction coefficient and toughness and can be formed or molded with various fillers, such as glass. A preferred button bearing is glass-filled Teflon.

It is to be noted that the shear bars 292 and 294 are relatively wide in the radial direction from the shaft 278 and spaced at different radii along their spokes 286 and 286' so that their inner and outer edges pass through different circumferential paths in the zone 266. Also the reverse blade 300 is radially off-set between the adjacent spokes 286' and is un-symmetrically located in relation to the other components carried on the shaft 278 and in substantial radial alignment with each other.

Means are provided to sense the consistency of the frozen homogeneous mass formed in the freezing chambers 66 as the drive motor 60 turns the beater shaft 278 and the shear blades 292 and 294 pass through the freezing zone 266. As the mass of product increases in viscosity due to the formation of tiny frazils of ice therein containing flavoring material, the work performed by the shear blades 292 and 294 increases and the torque required to turn the shaft 278 increases. When the viscosity of the mass reaches a predetermined value such that, for the particular product being prepared, the dispensed product upon release to the atmosphere at either of the valve 22 or 24 expands and forms a homogeneous, finely divided solid, long enduring stand-up mass of confection with the desired over-run of about 80%, the rate of refrigeration is controlled or maintained to establish equilibrium conditions in the freezing zone. As product is withdrawn fresh liquid blend is introduced at the inlet lines 272 and depending on the amount may or may not affect the viscosity of the frozen mass and the torque on the drive motor 60. Any fresh liquid blend is immediately pushed back into, or maintained, within the zone 297 by the impeller 300 for pre-cooling before it advances deeper into the zone 266 with additional withdrawals, or finally becomes a frozen flowable mass also as its temperature drops below the freezing point. The action of the impeller 300 prevents channeling of liquid blend along the surface of the beater shaft.

For the purpose of torque and consistency control the drive more 60 is a constant speed 60-cycle AC single phase motor. Referring to FIG. 14, this motor is connected to the 110 v. AC current supply by the leads 320 and 322, controlled by a suitable switch on the panel 14, through a motor coil not illustrated, and through the connectors 5–6 to the pick-up coil 324 of the ampere sensing relay 326. The motor coil is connected in series with the resistance 328 and the rheostat 330 through the connectors 5–6. The resistance 328 and the rheostat 330 each have resistances of about 1 ohm to illustrate and control the range of ampere level adjustment for the relay sensor is obtained by setting the rotatable contact arm 332 at the desired setting.

The relay has the movable contact 334 connected through the resistor 336 to the connector 4 to the 110 v. AC source. The stationary contact 338 of the relay connects to resistance 340 and condenser 342 (rated at 50 mfd.) of the second relay 344 in parallel and thence through the rectifier 346 to the connector 2 and by means of the lead 348 and the connector 3 to the 110 AC power source. The rectifier 346 is rated at 150 WVDC. The stationary contact 350 of the relay 346 connects by means of the lead 352 to connector 4 and one side of the 110 v. AC source and by means of the movable contact 354 and lead 356 back to connector 1. The connector 1 and connector 2 are connected to the coil 358 of the starter of the refrigeration motor 60. The resistor and rectifier 346 convert the signal through the control circuit to the starter 358 to DC and eliminates chatter or hum in the torque sensing circuit.

It has been found that under no load condition the ampere requirements of the drive motor 60, as an illustration, range from about 2.2 to 2.3 at 1800 r.p.m. Under full load conditions at about 1755 r.p.m. the ampere requirements of the motor 60 range from about 3.5 to 3.7. The torque sensing circuit of FIG. 4 may have any desired range of adjustment such as may be necessary to sense the amperes requirements of the drive motor during the freezing process taking place in the freezing zone 266, depending upon the rheological or viscous flow properties of the product which in turn are a function of the concentration of the ingredients, in this case, the Brix number. As an example, with the metering valves set at a Brix number of 14, the torque sensing circuit is set at a range of about 2.5 to 3.0 amperes by means of the movable contact 332 as the cut-in and cut-out points for the starter 358 on the refrigeration motor.

Thus, with the rheostat 330 set at an ampere range of 2.5 to 3.0 amperes, each time the motor 60 is under sufficient torque to call for more than 3.0 amperes the refrigeration is shut off through the relays 326 and 344 and the DC signal sent to the starter coil 358. And in the event the consistency drops as sensed by the relay 326, the circuit can function to start the refrigeration motor and maintain refrigeration or increase the flow of refrigerating medium to bring the consistency of the mass up to the predetermined value.

The double-acting micro-switch 150 (FIG. 3) on the sentinel 50 functions to actuate and open the solenoid valve 214 controlling the discharge of syrup to the blender 82 and operates only when the sentinel is in the full condition. This switch 150 also controls the solenoid valve 90 controlling the discharge of carbonated water in line 98 to the blender 82.

The micro-switch 166 controls the solenoid valve 215 and the discharge of syrup to the blender 84, operating or in open position only when the sentinel is in the full condition. This switch 166 also controls the solenoid valve 90' controlling the discharge of carbonated water in line 100 to the blender 84.

The second function of the switches 150 and 166 is to stop the refrigeration motor 70 when the liquid level in either syrup sentinel falls below a predetermined level or is empty. The blender micro-switch 85 in combination with the action of the carbonator micro-switch 85 and the syrup sentinel micro-switches 150 and 166 function as an over-riding control of the valves 214 and 215 and valves 90 and 90' to not only maintain the syrup sentinels in the ful condition, but also provide a closely controlled mix or blend of syrup and carbonated water in each blender, regardless of the demand placed on the withdrawal valves 22 and 24. In addition an over-riding thermostatic control can be provided to shut off all power to the unit so that it fails safe and there is no danger of rupture of any receptacles or a complete unit shut down results upon failure of any part of the system.

Start-up operation of the device is as follows: The designated switches in the control panel 14 are turned on and after adjustment of the metering valves to the desired Brix number of 13–15, meaning the ratio of syrup to carbonated water i.e., 1 volume of syrup per 14 volumes of carbonated water for the final product, the carbonator 80 fills and begins to furnish carbonated water to the pair of blenders 82 and 84 and at the same time the sentinels 50 and 50' supply syrup to the blenders. The system is bled of entrapped air, all micro-switches are adjusted and the blenders start to furnish liquid blend to their respective freezing cylinders 66. Unfrozen blend can be drawn off from the freezing cylinders, at start-up, through the valves 22 and 24. As soon as equilibrium conditions are established in the freezing zones the device operates to produce homogeneous frozen flavored product at the valves 22 and 24 for discharge in accordance with the demand.

I claim:

1. Apparatus for continuously metering and indicating the consistency of a liquid ingredient in a processing zone which comprises:
    a tubular processing vessel having an inlet at one end and an outlet at the other end;
    means to change a physical condition within said processing vessel to impart a change in consistency of said ingredient;
    a manifold support associated with said processing vessel;
    a weight-sensitive receptacle for said ingredient including a pair of supporting coiled conduits on one side thereof defining a gravity-actuated pivotal suspension therefor from said manifold support;
    one of said conduits defining an inlet communicating with a source of said ingredient from said manifold support and the other of said conduits defining an outlet from said receptacle and communicating through said manifold support with the inlet of said processing vessel;
    an electrically operated valve to control the flow of said ingredient from said receptacle to the inlet of said processing vessel;
    switch means responsive to the pivotal position of said receptacle and connected to said valve to open and close said valve in accordance with the pivotal position of said receptacle in relation to said manifold support and maintain a controlled flow to said processing vessel;
    and means responsive to the physical condition of said ingredient in said processing vessel to control said means to change a physical condition of said ingredient.

2. An apparatus in accordance with claim 1 in which:
    said conduits comprise tubular resilient co-axial coils each having at least one complete turn with extended substantially coplanar end portions affixed on one side through a wall of said receptacle and affixed on the other side to said manifold support defining said ingredient source; the diameters of said coils being substantially equal.

3. An apparatus in accordance with cliam 2 in which:
    said conduits include a third tubular resilient co-axial coil axially aligned therewith and substantilly the same diameter defining a bleeder line for said receptacle with its extended end portions being substantially coplanar with the end portions of said conduits and affixed between said receptacle and said manifold support.

4. An apparatus in accordance with claim 1 including:
    a plurality of said weight sensitive receptacles each adapted to feed an ingredient from said manifold support through its associated pair of supporting coiled conduits back to said manifold support to said processing vessel under the control of a switch means and with a valve means controlling the outlet therefrom to said manifold support;
    one of said receptacles defining a blending zone and being connected through its associated pair of supporting coil conduits so as to receive an ingredient from at least two other recetpacles from said manifold support;
    said pair of coiled conduits having extended substantially coplanar end portions connected to adjacent inlet lines extending into the interior of said one receptacle; and
    a transverse baffle plate is provided adjacent to and spaced from the extended ends of said inlet lines upon which said ingredients impinge and said plate has a supporting side wall with openings therein to allow egress of the fluid blend into said one receptacle.

5. An apparatus in accordance with claim 1 including:
    a beater shaft extending within said processing vessel and having at least a pair of radial spoke members circumferentially spaced from each other and adapted to axially support said shaft within said vessel;
    said spokes having plastic cap members on their extended ends;
    said cap members being composed of material having a low coefficient of friction and adapted to slidably engage an inner wall of said processing vessel to rotatably support said shaft therein;
    said beater shaft being provided with a shear blade adapted to pass through said ingredient;
    motor means to drive said beater shaft;
    said means to change a physical condition comprises a freezer coil;
    means to sense the ampere consumption of said motor means as a measure of the torque required to rotate said beater shaft;

means responsive to said ampere sensing means to control the means to change a physical condition of said ingredient whereby the consistency thereof is maintained within predetermined values.

6. An apparatus in accordance with claim 5 in which: three of said spoke members are provided at radial spacings of about 120° from each other on said shaft.

7. An apparatus in accordance with claim 5 in which: said cap members are composed of a halo-carbon plastic material.

8. An apparatus in accordance with claim 7 in which: said halo-carbon comprises a polytetrafluoroethylene thermoplastic.

9. An apparatus in accordance with claim 6 in which: said spoke members extend from said beater shaft at the end of said processing zone and are substantially circumferentially aligned thereabout.

10. An apparatus in accordance with claim 5 in which:
at least a pair of said shear blades are provided on said beater shaft;
said blades extending longitudinally through said processing zone at different radial spacings from said beater shaft and being spaced at one of their ends from the inlet end of said processing vessel; and
an impeller as provided on said beater shaft within the space between the ends of said shear blades and said inlet end of said processing vessel said impeller having a blade pitched in a direction opposite that of the flow of ingredients from said inlet end whereby to form a pre-treating and reverse flow zone for incoming ingredients and prevent channeling through said processing zone.

11. An apparatus in accordance with claim 1 in which:
beater means are included in said processing vessel having spaced shear blades adapted to pass circumferentially therethrough;
the ends of said shear blades being spaced from the inlet end of said processing vessel;
an anti-channeling impeller on said beater means adjacent said ends of said shear blades; and
said impeller being pitched in a direction opposite that of the flow of ingredient into said processing vessel.

12. An apparatus in accordance with claim 1 in which: said conduits comprise tubular resilient coaxial coils each having at lest one complete turn with substantially coplanar opposite end portions extending from the same side of each coil and affixed through a wall of said receptacle and extending from the other side of each coil to said manifold support.

13. An apparatus to produce a frozen homogeneous flavored confection comprising:
a source of water under pressure;
a source of carbonating gas under pressure;
a source of liquid flavoring material under pressure of carbonating gas;
a carbonator vessel having resilient inlet lines to convey water and carbonating gas into mixture therein and a resilient outlet line from said carbonator;
said resilient lines to and from said carbonator adapted to pivotally and resiliently support carbonator vessel;
a single-acting micro-switch having an actuator arm in contact with a pivoting part of said carbonating vessel;
a first solenoid valve controlling the flow of carbonated water from the outlet of said carbonator and connected to said carbonator micro-switch to open same at a predetermined level of carbonated water therein;
a flavoring material sentinel vessel having a resilient inlet line to convey said flavoring material from said source to the interior of said sentinel vessel and a resilient outlet line from said sentinel vessel;
said resilient lines to and from said sentinel vessel adapted to pivotally and resiliently support said sentinel vessel;
a double-acting micro-switch having an actuator arm in contact with a pivoting part of said sentinel vessel;
a second solenoid valve controlling the flow of flavoring material from the outlet of said sentinel vessel and connected in one position to maintain said microswitch in said sentinel vessel in open position at a predetermined level of flavoring material therein;
a blender vessel having resilient inlet lines to convey carbonated water from said first solenoid valve and flavoring material from said second solenoid valve into the interior thereof for admixture to prepare a blended liquid solution and a resilient outlet from said blender vessel to convey said blended liquid solution therefrom, said resilient inlet and outlet lines on said blender vessel adapted to pivotally and resiliently support said blender vessel;
a single-acting micro-switch having an actuator arm in contact with a pivoting part of said sentinel vessel;
a freezing zone in communicition with the resilient outlet of said blender vessel having means to cool said freezing zone to a temperature below the freezing point of said blended liquid solution to prepare a frozen flowable mass therefrom;
a motor-driven beater shaft within said freezing zone having shear blades thereon rotatably carried through said frozen flowable mass within said freezing zone;
torque sensing means connected to said motor of said beater shaft adapted to produce a direct current signal proportionate to the consistency of said frozen flowable mass;
the second position of said double-acting micro-switch connecting to close the solenoid valve in the outlet of said carbonator and deactivate the motor for said beater shaft; and
circuit means connecting said torque sensing means to said means to cool said freezing zone whereby the consistency of said product in said freezing zone is maintained within predetermined values regardless of the demands upon the outlet of said freezing zone and a constant supply of said carbonated water and flavoring material is supplied to said blender.

14. An apparatus adapted to prepare a carbonated frozen homogeneous confection of a predetermined uniform consistency comprising:
a tubular process vessel having an inlet at one end and an outlet at the other end;
means to lower the temperature of said process vessel to the freezing point of said confection;
a manifold support associated with said process vessel providing separate sources of carbon dioxide, water and a flavoring material as ingredients for said confection;
weight-sensitive receptacles for said ingredients connected to and supported by said manifold support;
said receptacles including a carbonator receptacle adapted to prepare carbonated water; a receptacle adapted to dispense said flavoring material and a blending receptacle adapted to prepare a liquid blend of said carbonated water and said flavoring material and communicating at its outlet with said processing vessel;
means to pivotally and resiliently mount said receptacles in a gravity-sensitive attitude from said manifold including a plurality of flexible coiled conduits connecting from said manifold to each of said receptacles defining inlet and outlet communications therebetween;
valve means to control the flow of carbonated water from said carbonator to said blending receptacle and to control the flow of said flavoring material to said blending receptacle;

means individually responsive to the pivotal position of said receptacles and operably connected to said valve means to open and close said valve means in accordance with the pivoted position of said receptacles and maintain a controlled flow to said blending receptacle and to said processing vessel; and mean responsive to the consistency of the freezing confection in said processing vessel to control said means to lower the temperature of said confection.

15. An apparatus in accordance with claim 14 including:
means to shut off said temperature lowering means at a predetermined pivotal position of one of said receptacles indicating less than a full condition.

References Cited

UNITED STATES PATENTS

| | | | |
|---|---|---|---|
| 2,559,032 | 7/1951 | Tacchella | 62—136 |
| 2,572,541 | 10/1951 | Thompson et al. | 222—129.3 |
| 2,746,730 | 5/1956 | Swenson et al. | 259—D 1632 |
| 2,903,163 | 9/1959 | Newman | 222—129.4 |
| 3,196,627 | 7/1965 | Swenson | 62—136 |

MEYER PERLIN, Primary Examiner

R. C. CAPOSSELA, Assistant Examiner

U.S. Cl. X.R.

62—306, 343; 222—55, 57, 129.4